Feb. 11, 1964
R. H. DAVIS
3,121,177
ACTIVE THIN-FILM DEVICES CONTROLLING
CURRENT BY MODULATION OF A QUANTUM
MECHANICAL POTENTIAL BARRIER
Filed Jan. 23, 1962
2 Sheets-Sheet 1
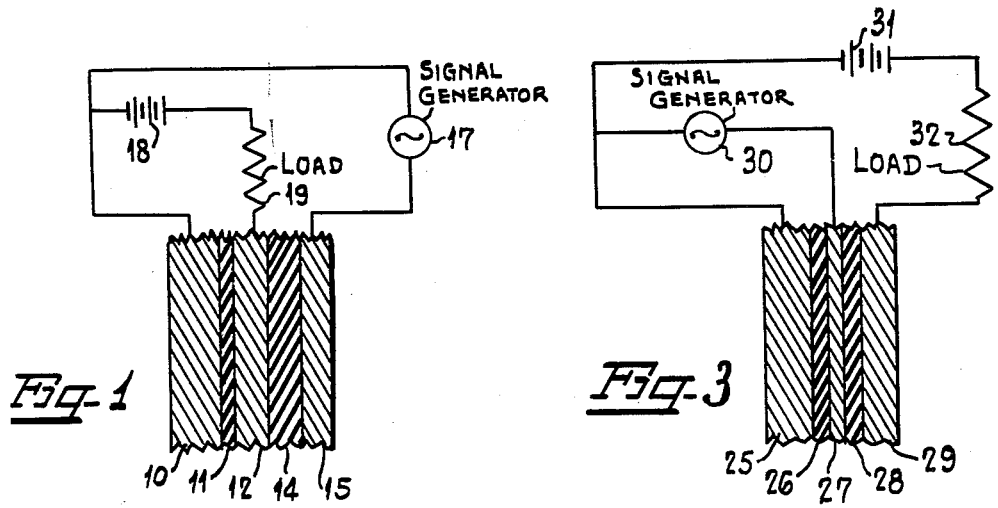
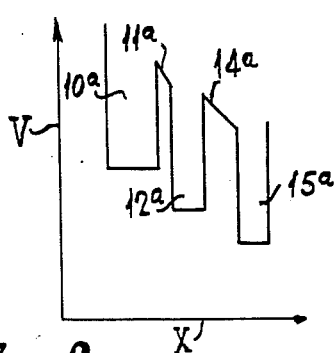
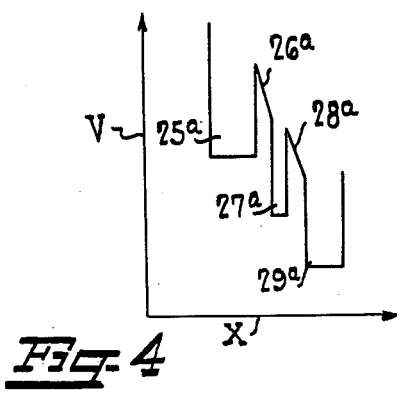
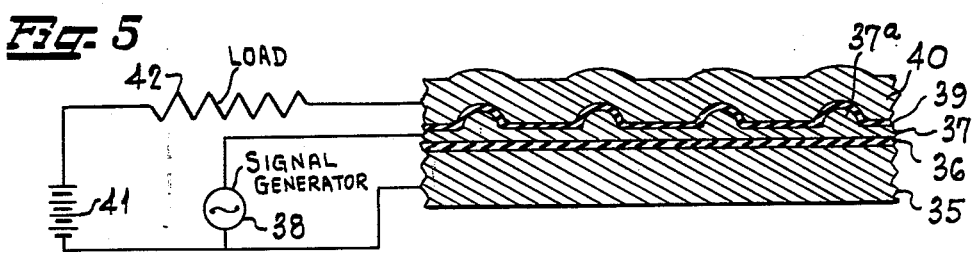
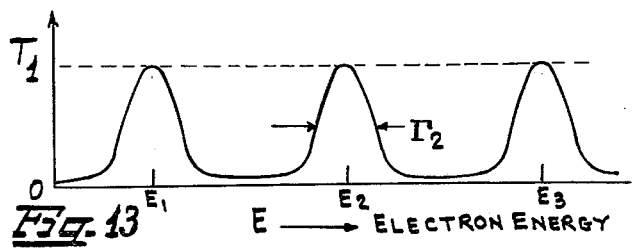
INVENTOR:
ROBERT H. DAVIS
By Robert Brown Jr.
ATTORNEY Feb. 11, 1964
R. H. DAVIS
3,121,177
ACTIVE THIN-FILM DEVICES CONTROLLING
CURRENT BY MODULATION OF A QUANTUM
MECHANICAL POTENTIAL BARRIER
Filed Jan. 23, 1962
2 Sheets-Sheet 2
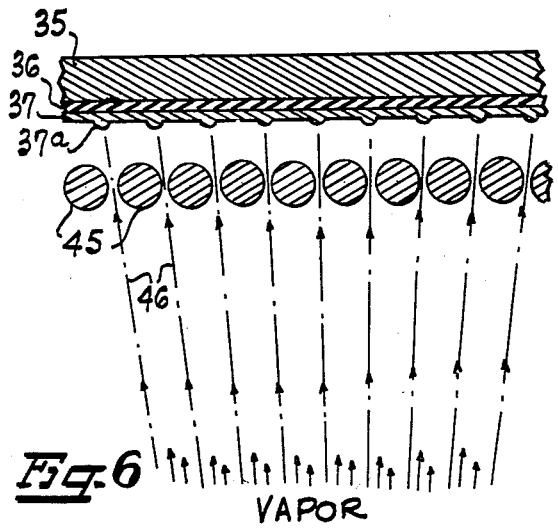
Fig. 6
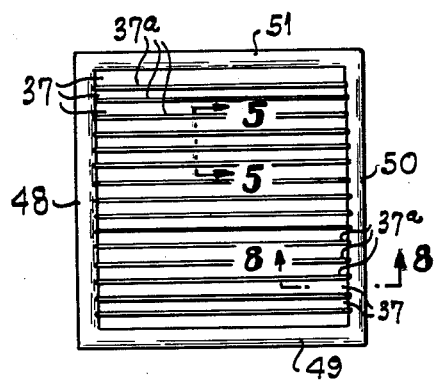
Fig. 7
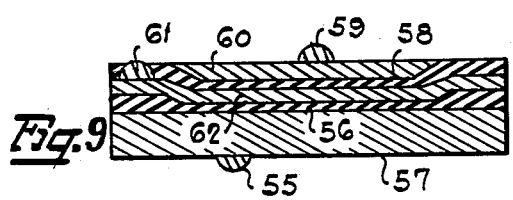
Fig. 9
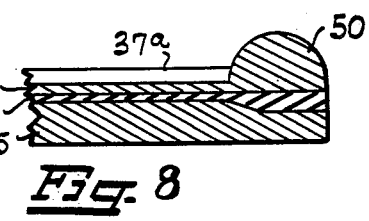
Fig. 8
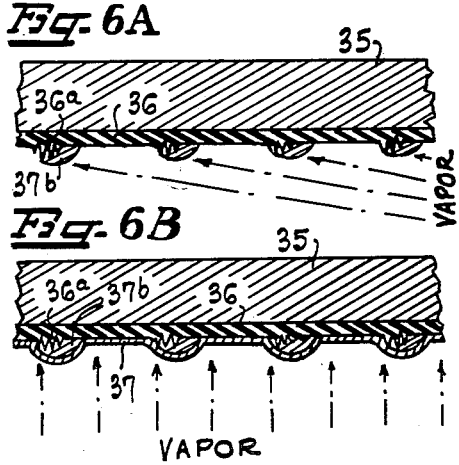
Fig. 6A
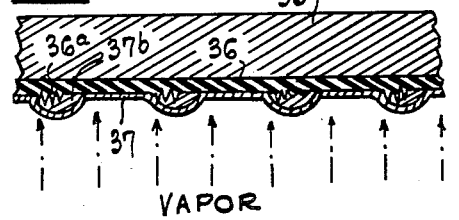
Fig. 6B
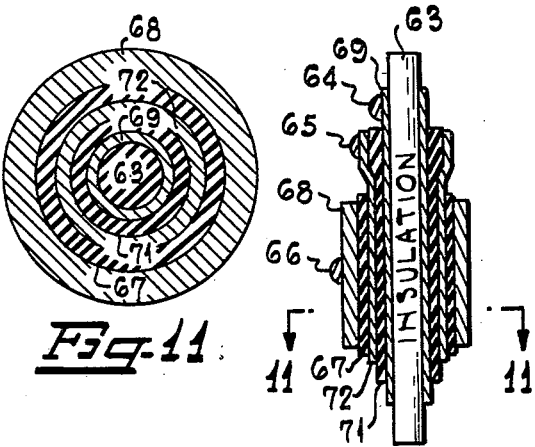
Fig. 11
Fig. 10
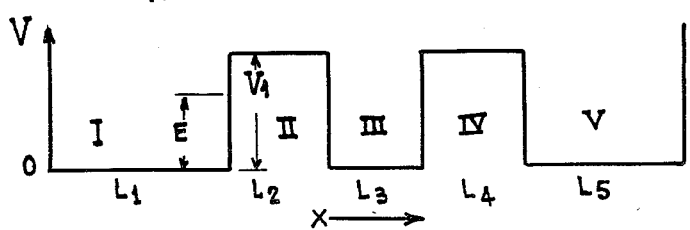
Fig. 12
INVENTOR:
ROBERT H. DAVIS
BY Robert Brown Jr.
ATTORNEY

United States Patent Office 3,121,177
Patented Feb. 11, 1964

3,121,177
ACTIVE THIN-FILM DEVICES CONTROLLING CURRENT BY MODULATION OF A QUANTUM MECHANICAL POTENTIAL BARRIER
Robert H. Davis, 726 Ivanhoe Road, Tallahassee, Fla.
Filed Jan. 23, 1962, Ser. No. 168,161
16 Claims. (Cl. 307—88.5)

This invention relates to a device for the control of an electric current by modulation of a quantum mechanical potential barrier. In application, the device may function as a current amplifier or a voltage amplifier. It is rugged, compact, easy to fabricate, and does not involve crystallization of semi-conductor materials.

The essential feature of the present invention is the exercise of electron current control between two conducting elements or electrodes by varying the barrier and consequently the quantum mechanical transmission of electrons between the two electrodes. The exponential dependence of the transmission on the integrated barrier parameter makes the latter a strong control parameter.

It is an object of this invention to impose barrier modulating electric or magnetic fields by placing a conducting or magnetic element either between the above-mentioned electrodes or outside them.

It is another object of this invention to provide a device of the class described comprising three conducting films or electrodes separated respectively by two insulating films, in combination with means for forming standing electron waves in the central electrode, and an electrical control signal for tuning and detuning the device to resonance operation.

It is another object of this invention to provide a microgrid construction of the above-mentioned central element or electrode to be used either as a collector or a control element.

It is a further object of this invention to form the central electrode of such thickness that the device operates at or in the vicinity of a transmission resonance depending upon the control signal.

It is a still further object of this invention to employ various plastics and low temperature metals to form the insulating and conductive elements of the device.

Some of the objects of the invention having been stated, other objects will appear as the description proceeds when taken in connection with the accompanying drawings, in which, FIGURE 1 is a diagrammatic view of a current amplifier embodying the invention;

FIGURE 2 is an electron potential diagram for the current amplifier shown in FIGURE 1;

FIGURE 3 is a diagrammatic view of a voltage amplifier embodying the invention;

FIGURE 4 is an electron potential diagram for the voltage amplifier of FIGURE 3;

FIGURE 5 is a diagrammatic view similar to FIGURE 3 but showing the central control element with a thickness varied in a grid pattern;

FIGURE 6 is a diagrammatic view showing the method employed in making the microgrid control element of FIGURE 5;

FIGURES 6A and 6B taken together illustrate another method of constructing the microgrid control elements;

FIGURE 7 is a face view of the microgrid control element showing the grid ribs electrically connected by conductors;

FIGURE 8 is an enlarged sectional detail view taken along line 8—8 in FIGURE 7;

FIGURE 9 is a diagrammatic view of a modified form showing a planar embodiment of the device;

FIGURE 10 is a sectional view through another modified form showing a cylindrical embodiment of the device;

FIGURE 11 is a sectional view taken along line 10—10 in FIGURE 10;

FIGURE 12 schematically shows a double barrier through which resonance transmission may take place, and FIGURE 13 shows the behavior of the transmission coefficient for a double barrier such as that given in FIGURE 12.

The tunneling phenomenon considered here is related to field emission of electrons where electrons may be drawn between two electrodes in a vacuum if the field between these two electrodes is in excess of $10^5$ volts/cm. This phenomenon has been known for many years and is a result of quantum mechanical tunneling of the barrier by electrons leaving the emitter surface. The transmission of the electrons through the barrier is given by $$T = \exp -2 \int_a^b \sqrt{2m(V-E)} \frac{dx}{\hbar} \qquad (1)$$

where the quantities $m$, $V$, and $E$ are the electronic mass, the potential energy as a function of distance $x$, and the energy of the electron, respectively. The quantity $\hbar$ is Planck's constant divided by $2\pi$. The integral is carried out over the region where $V$ is larger than $E$. For a more detailed discussion of this phenomenon reference is made to the publication entitled Quantum Theory, by David Bohm, Prentice-Hall, New York (1951), pages 270–280.

The limits $a$ and $b$ of the integral sign are the bounds of the region in which the potential in which the particle moves is greater than the energy of the particle. Classically, this region cannot be entered by the particle as long as its energy is less than the barrier height. Quantum mechanically, the particle may penetrate the barrier, and indeed, if the barrier is sufficiently thin, the particle will pass through the barrier with a significant probability.

Integrating over the number of electrons with energies up to the Fermi level in the emitting metal surface, the equation for the current has the form $$I = A\epsilon^2 \exp -B/\epsilon \qquad (2)$$

where A and B are constants, $\epsilon$ is the imposed electric field at the surface of the emitting metal. See R. H. Fowler and L. Nordheim, Proc. Roy. Soc. A119, 173 (1928).

In the case of conducting layers, the thickness of the films depends upon whether or not size resonances (or transmission resonances) are desired for operation. In those conducting films where resonance transmission in the vicinity of a size resonance is a design aim, the film thickness is specified to locate the size resonance for a given quiescent voltage.

In the case of insulators, the thickness of the films depends upon whether or not the film is to operate as a tunnelling or control barrier or as a completely insulating barrier. In detail, the thickness depends upon the bias or quiescent voltage to be imposed across the insulating film. The insulating layers are of two types, (a) those which serve as control barriers and through which electrons tunnel and (b) those which completely stop electron flow and serve capacitatively to couple control elements. In that the electrons of a material are tightly bound and the material otherwise satisfies the definition of an insulator, it will serve as an insulator in the present invention.

In general the design function and operation of the devices are dependent primarily on the thickness of the films and their character as insulators or conductors. A specific choice of material may be one of fabrication convenience. It is also true that in case of conducting films, the value of Fermi energy is of importance in computing the spectrum of size resonances. However, the theory and operation of the present devices will not be basically altered by a Fermi energy different from that of the bulk stuff.

In the present invention the electrodes are spaced apart by a distance of $10^{-7}$ centimeters to $10^{-3}$ centimeters. This made mechanically possible by the deposition of a thin insulating film between the two electrodes, the second electrode being deposited by evaporation. Other thin-film deposition techniques are applicable. Thus a bias voltage of the order of 10 volts provides electric field strengths in the range $10^4$ to $10^8$ volts/cm. for film thicknesses $10^{-3}$ to $10^{-7}$ centimeters. While the insulating film contains electrons, these are tightly bound and play no significant role in the operation of the device. The film acts as a spacer to establish a quantum mechanical potential barrier.

It is apparent in Equation 2 that the quantum mechanical tunneling current is strongly dependent on the electric field or imposed bias voltage. Use is made of this dependence in a novel combination of electrodes.

One other quantum mechanical effect is of importance in this invention. Electrons may be trapped in a potential well even though they classically have sufficient energy to pass over it. The condition for trapping is essentially the condition for the formation of standing waves. In FIGURE 12, a double potential energy barrier is shown for a particle entering from the left with energy E. It can be quantum mechanically shown that in general the transmission of a particle of energy E (less than $V_1$, the barrier height) through both of the barriers is small unless E is close to the top of the barrier. (See Quantum Theory Supra pages 242–244 and 283–286 for a discussion of transmission resonances.) Even for a particle with E greater than $V_1$, the transmission is in general less than one. However, for those values of E such that $L_3$ is equal to an integral number of half particle wave lengths, the transmission coefficient T is equal to one even though E is considerably less than V. This is also true for the case E greater than $V_1$. Consequently, all of the particles incident form the left side satisfying this condition appear to the right of both barriers with unit probability.

Mathematically, the condition for resonant transmission for electrons is $$\frac{n\lambda}{2} = L_3 \qquad (3)$$

where $\lambda$ is the electron wave length, $n$ is a positive integer, and $L_3$ is the width of the potential well. In terms of the electron energy E, mass $m$ and potential V, the wave length may be written $$\lambda = \frac{h}{p} = \frac{h}{\sqrt{2m(E-V)}} \qquad (4)$$

Using the above-defined quantities, the condition for standing electron waves may be written $$\frac{n}{2} \frac{h}{\sqrt{2m(E-V)}} = L_3 \qquad (4a)$$

where $p$ is the electron momentum and h is Planck's constant. Planck's constant is one of the constants of nature, that is, $6.65 \times 10^{-27}$ erg-sec. The transmission coefficient behaves as shown in FIGURE 13. It reaches maximum values of one for electron energies equal to transmission resonance energies, three of which are labeled by $E_1$, $E_2$ and $E_3$. In the vicinity of resonances, the transmission coefficient has the mathematical form $$T = \frac{1}{1 + 4(E - E_n)^2/\Gamma_n^2} \qquad (5)$$

where $\Gamma_n$ is the width of the $n$th resonance at half maximum.

Making use of Equations 3 and 4

$$E_n = \frac{n^2 h^2}{8mL^2} \qquad (6)$$

where L is the width of a well in which standing waves may be formed. Thus operating the device shown in FIGURE 4, with the signal voltage $V_s$ adjusted so that $$V_s q + F = E_n \qquad (7)$$

where F is the Fermi energy of the central electrode, the energy of the tunneling electrons is equal to a size resonance energy for quantum number $n$. The response of the device will be sharply tuned. On the lower side of the resonance, an amplification results. On the upper side, the current decreases as $V_s$ and E increase.

Fermi energy is the property of a particular material, and since it depends upon average quantum effects in a large number of atoms, it is expected to change as the thickness is substantially reduced below 1000 A. Physically it is a measure of the depth of the potential well in which the conducting electrons in the metal move.

Similar considerations enter into the operation of the device in FIGURES 1 and 2. The device may be sharply tuned by making 12 sufficiently thin to resolve the standing wave or size resonances according to Equation 6. By increasing the thickness of 12, the spacing between resonances decreases and the density increases. Since the current passed from 10 through 11 and into 12 depends on the density of states available in 12, the limit on the current drawn is specified by the thickness of 12.

The device comprises three conducting films separated from each other respectively by two insulating films. Two modes of operation will be disclosed in the discussion of FIGURES 1 through 4. The formation of standing waves in the central film is important in both modes. The novel design disclosed in FIGURES 1 and 2 also makes use of an external electrode to impose a barrier modulating electric field. In FIGURES 3 and 4, the control electrode 27 is of such thickness that standing electron waves are formed and transmission through the control electrode and second barrier 28 is enhanced. Further specialization and novelty in the construction of the central control electrode is disclosed in the discussion of FIGURES 5 through 8. FIGURES 9 and 10 show embodiments in two geometries.

In FIGURES 1 and 2, a layer of good conducting material 10, such as aluminum or silver, is deposited on a smooth substrate such as glass or plastic (substrate not shown). Evaporation of this material is envisaged, but other thin-film deposition techniques are applicable. An insulating layer 11 is then evaporated or otherwise deposited on electrode 10; the thickness of the insulating layer to vary from $10^{-7}$ to $10^{-4}$ centimeters. Typical applications involve layers of $10^{-6}$ centimeters in thickness. A suitable insulating material is evaporated nylon. Other plastics such as polystyrene, "Mylar" and "Teflon" produced by E. I. du Pont de Nemours & Co., and vinyl plastics may be used. Oxides of various metals may also be deposited upon the insulating layer 11. The best suited oxides are silicon oxide, titanium oxide, and aluminum oxide. Functionally, layer 11 provides a nonconducting gap between electrodes 10 and 12 and consequently a quantum mechanical barrier. Electrode 12 is evaporated aluminum, gold, or copper and has a thickness of approximately $10^{-3}$ centimeters. When the device is to operate in the vicinity of an isolated resonance, the thickness lies in the range $10^{-7}$ to $10^{-4}$ centimeters. A grid assembly may be used as disclosed in FIGURES 5 through 8. In FIGURE 1, an insulating layer 14 separates a control electrode 15 from electrode 12 and is of a good insulating material such as nylon with a thickness of approximately $10^{-3}$ centimeters. In operation, electrons in electrode 10 initially fill potential well 10a of FIGURE 2 up to the Fermi level. Those close to the Fermi level quantum mechanically tunnel through barrier 11a imposed by insulating layer 11 and are collected in a potential well 12a provided by conductor 12. An electrode 15 provides a well 15a (FIGURE 2). The barrier is modulated by the coupling of electrode 15 with electrode 10 which, in turn, capacitatively modulates the barrier 11a in FIGURE 2. The depressed potential on electrode 15 induces the current flow from electrode 10 to electrode 12; raising the potential of electrode 15 would inhibit the flow of electrons. Barrier 14a, provided by insulating layer 14, is much thicker than barrier 11a and consequently transmission of electrons from electrode 12 to electrode 15 is inhibited by Equations 1 and 2. The result is a modulation of the current passing from electrode 10 to electrode 12 due to a signal imposed on electrode 15 by the signal generator 17. The bias between the electrodes 10 and 12 is nominally maintained by a battery 18 and drives the current through load 19.

In FIGURES 3 and 4, a conducting film 25 is overlaid with an insulating film 26, said conducting film being at least $10^{-3}$ centimeters thick and fabricated of aluminum, copper, indium, lead, or silver. The insulating film 26 is $10^{-7}$ to $10^{-4}$ centimeters thick and is a deposited film of nylon, polystyrene, "Teflon," "Formvar" produced by Shawinigan Resins Corp. of Springfield, Massachusetts, or vinyl plastic. Oxides of titanium, magnesium, aluminum, or silicon may also be used. A control element 27, made of one of the aforementioned conducting materials and $10^{-7}$ to $10^{-3}$ centimeters thick, is deposited in the form of a film upon layer 26. Insulating layer 28 is deposited on control element 27 and is one of the aforementioned insulating materials with a thickness of $10^{-7}$ to $10^{-3}$ centimeters. Finally, electrode 29 is deposited upon layer 28. The electrodes 25, 27 and 29 respectively provide potential wells 25a, 27a and 29a, and the insulating layers 26 and 28 impose barriers 26a and 28a respectively. In operation, a signal voltage from signal source 30 modulates the quantum mechanical barrier transmission.

Electrons, passing from electrode 25 through insulating layer 26, also pass through control element 27 since its thickness is much less than the electron mean free paths. Because of quantum mechanical reflection at a potential discontinuity some electrons incident on barrier 28 are reflected even when an electron may energetically pass over the letter barrier. A transmission resonance occurs when the thickness of electrode 27 is equal to an integral number of electron half wave lengths. This is of crucial importance when the electron energy is less than the barrier height 28a seen in FIGURE 4. Conduction electrons in well 25a tunnel through barrier 26a and pass through well 27a because the width of well 27a of film 27 is less than the electron mean free path. The tunneling of electrons through barrier 28 is controlled by a signal from source 30 on control electrode 27. Electrons passing through 27 enter the current loop containing bias voltage supply 31 and external load 32.

In making electrode 27 thinner than the electron mean free path, the resistance of the electrode to the lateral transfer of electrons is increased and the effectiveness of electrode 27 in maintaining the necessary potential for the extraction of electrons from electrode 27 may be impaired under certain conditions. Accordingly, the construction shown in FIGURE 5 may be of importance. In such construction, electrons are supplied by a conducting film 35 and tunnel through an insulating film 36 because of the field imposed by control film 37. Most of the area of the control electrode is thin compared to electron mean free paths, as it is at 37. In order to effectively maintain a potential distributed throughout the control element 37, ribs 37a are shown which are of the same material as element 37 and an integral part of the latter. The thickness of control element 37 between the ribs 37a is small compared to electron mean free paths, said thickness ranging from $10^{-7}$ to $10^{-4}$ centimeters, whereas thickness of the element at the ribs 37a is as much as $10^{-2}$ centimeters. Thus, the potential required to draw electrons from electrode 35 is maintained on the average at the same time most of the control element is transparent to the electrons. Spacing between ribs 37a is at least $10^{-2}$ centimeters or $10^{3}$ electron mean free paths in the conducting of material.

As seen from the external circuit, the device is to operate in a similar fashion to the device of FIGURES 3 and 4 in response to signalling device 38. Electrons passing through control element 37 also tunnel or pass over the barrier imposed by film 39 and reach conducting film 40, where they then enter the loop containing bias supply 41 and external load 42.

FIGURE 6 shows one method for fabrication of control element ribs or microgrids by masked evaporation. The barrier film 36 is deposited on conducting substrate 35 and the uniform film 37 is deposited before the masked evaporation takes place. The mask in this embodiment is a set of parallel wires 45. The gaps between adjacent wires allow the vapor to follow paths 46 and be deposited to build up ribs 37a.

The ribs 37a in FIGURE 7 are shown on an exaggerated scale for the purposes of illustration. FIGURE 7 shown a face view in which the emitter conducting film 35 and barrier film 36 have been covered with the ribbed controlled electrode 37, 37a. A heavy deposit of conducting metal encloses the control electrode area and comprises segments 48, 49, 50 and 51. An enlarged section along line 5—5, with the additional insulating and conducting layers 39 and 40 respectively, is shown in FIGURE 5. Most of the area is thin control electrode film 37.

Taking a section along line 8—8 and magnifying the structure including side 50, we have an arrangement shown in FIGURE 8. The build up of the rib 37a and rib cross tie or side 50 is displayed, the layers 39 and 40 being omitted. The emitter conducting film 35, the barrier insulator 36, the transparent part 37 of the control film, the rib 37a, and the cross tie 50 at the end of the ribs, are shown in this view. The transparent film 37, the rib 37a, and the cross ties are integral as a result of successive masked deposition of the conducting material.

FIGURE 9 shows the device in a flat geometry, the thicknesses being extremely exaggerated for the purpose of illustration. Electrons are drawn from metal conductor 57 through barrier 56 to electrode 62. Depending upon the mode of operation, electrons may be either collected or transmitted by electrode 62.

If collected, the device is used as a current amplifier and the control element 60 capacitatively influences the barrier 56 between electrodes 57 and 62. In one embodiment gold is used for the conducting layers and nylon for the insulating layers. The collector layer 62 is $10^{-5}$ to $10^{-4}$ centimeters thick and since this is comparable or greater than the electron mean free path for an electron energy several electron volts above the Fermi level, the resonance condition is not important since the resonances overlap to form a continuum. Current control is effected by barrier modulation. Insulating film 56 is $10^{-7}$ to $10^{-6}$ centimeters thick, and film 58 is $10^{-3}$ centimeters thick.

In another current amplifier embodiment the collector layer 62 is of copper and thin compared with the electron mean free path. The resonance condition (Equation 3) is of importance. Assuming a Fermi energy of 7 electron volts in copper and a bias voltage of 3 volts between electrodes 57 and 62, the energy of transmitted electron in electrode 62 has a wave length of about $4 \times 10^{-8}$ centimeters. The resonance condition obtains for thickness 2, 4, 6, 8, 10, etc. A. (A.=1 Angstrom= $10^{-8}$ centimeters). A suitable thickness is $10^{-7}$ centimeters (=10 A.). The transmission (Equation 1) in the vicinity of the resonance is approximately $$T = \frac{1}{1 + 4(E - E_n)^2/\Gamma^2} \qquad (8)$$

where $\Gamma$ is the width of the resonance of half maximum value. The quantities "E" and "$E_n$" are the electron energy and the resonance energy respectively. A signal on control element 60 modulates the bias and consequently "E" in Equation 8. Insulating films 56 and 58 are about $10^{-7}$ and $10^{-3}$ centimeters thick respectively. This embodiment also satisfies the necessary condition that $$F+V_e=E_n=5 \qquad (9)$$

since the energy for the "$n=5$" state is 10 ev. which equals the sum of the Fermi energy "F" and the energy due to the nominal bias of 3 volts. ("V" is the bias voltage and "e" the electronic charge.) It is apparent that other metals may be used providing the transmission resonance conditions are met by adjustment of the thickness of 62 and the bias between 57 and 62. To collect the current trapped in 62, a microgrid structure disclosed in FIGURES 5 and 7 may be used.

If the device is operated analogously to a hard tube triode, electrons are passed through electrode 62 which itself may be a ribbed microgrid construction such as disclosed in FIGURES 5 through 7. The electrons then tunnel through or pass over the barrier imposed by insulating film 58 and reach electrode 60.

Here it is necessary to consider transmission resonances since the film 62 must be thin compared to the electron mean free path. If the conducting films are of gold with an assumed Fermi energy of about 5.5 ev. and the quiescent bias voltage between 57 and 62 is 4.0 volt, the wave length of the transmitted electron is about 4 A., choosing a thickness of electrode 62 as about 20 A. which corresponds to the operation at the 10th transmission resonance is specified. The energy of the electron in electrode 62 is 9.5 ev. which is consistent with the energy of the 10th state which is about 10 ev.

Electrical connections are indicated at points 55, 59 and 61. Suitable connection can be made by silver paste, silver epoxy, indium solder, or spot welding.

In FIGURE 10 a cylindrical embodiment of the invention is shown. The numeral 63 designates an insulating rod of glass or plastic. Evaporated or otherwise deposited on this rod is a conducting film of aluminum, indium, or other bulk conductor 69. Insulating layer 71 is then deposited. This layer may be of nylon, "Mylar," polystyrene, polyethylene, or a layer of oxides of aluminum, titanium, magnesium, or silicon. The middle electrode 72 is of one of the above-mentioned conducting materials. It is jacketed with an insulating layer 67 of one of the previously mentioned insulating materials. The third electrode 68 is deposited outside. Three electrical connections 64, 65, and 66 are provided on electrodes 69, 72 and 68, respectively, by means of silver paste, silver epoxy, indium solder, or spot welding. This geometry may be used with either the central or outside electrode as the control element, as disclosed in FIGURES 1 and 2 or FIGURES 3 and 4. The invention may be embodied in spherical or other geometries.

Where the device need not operate at elevated temperatures, simplification in the fabrication results from the use of low melting temperature conducting materials and insulators. Indium, lead, and antimony are best suited for the conducting materials, and the aforementioned nylon, "Mylar," polyethylene, and polystyrene are used for the insulators. Where high temperature operation is envisaged, use of copper, gold, nickel, and chromium is specified for the conducting films while the insulating films are of refractory oxide materials such as titanium oxides, zirconium oxide, silicon oxide, magnesium oxide, and beryllium oxide.

The best suited technique for deposition of the thin film is evaporation. Other means of thin-film deposition which do not contaminate the film interfaces are also applicable.

The effective field responsible for the transmission of electrons through an insulator barrier may be increased to a value several times that of the nominal imposed electric field by providing a rough conductor surface for the emission of electrons. This effect has been observed in the cold emission of electrons and effective fields three or four times that of the nominal imposed field have been recorded. The roughness of the emitter surface may be increased in a controlled fashion by etching either with a liquid or corrosive vapor or by scoring the substrate on which the emitter film is deposited or the emitter film itself.

The microgrids disclosed in FIGURES 5 through 8 may be fabricated as indicated in FIGURE 6 by masked evaporation of the conducting material. They may be also constructed by eroding or sputtering away of material between the ribs by electron or ion bombardment. A third technique for construction of microgrids involves condensation of vapors directed at a scored substrate at a grazing incident angle as shown in FIGURE 6A. The scored ridges 36a will accumulate a heavy deposit 37a of the conducting material. The rest of the area will be covered with a uniform layer 37 thin compared to electron mean free paths in a subsequent broadside evaporation shown in FIGURE 6B.

Electron beam scanning may be employed to selectively build up or controllably sputter thin films to yield control elements. Other techniques includes the use of evaporation, electrolysis, chemisorption and chemical reaction, printing, painting, and spraying to deposit the conducting and insulating films.

In the drawings and specification preferred embodiments of the invention have been disclosed, and although specific terms are employed, they are used in a generic sense and not intended for the purpose of limitation, the scope of the invention being set forth in the following claims.

I claim:
1. A device for controlling an electric current by modulation of a quantum mechanical potential barrier comprising; a centrally positioned and two externally positioned layers of conducting metal arranged in spaced relation, one of said external layers being an electron emitter electrode, two layers of insulating material arranged respectively between and contacting the inner opposed faces of the conducting layers, means for applying an electrical operating potential to each of said conducting layers, means for forming standing electron waves in said central layer to satisfy the conditions of the formula

$$\frac{n}{2}\frac{h}{\sqrt{2m(E-V)}}=L$$

in which $h$ is Planck's constant, $n$ is an integer, $m$ is the electronic mass, E is the energy of the electron, V is the potential as a function of distance $x$, and L is the width of the potential well restricted by this equation to integral multiples of half electron wave lengths, and an electrical control signal for tuning and detuning the device to resonance operation.

2. A device as defined in claim 1 wherein the thickness of each of said insulating layers ranges between $10^{-7}$ centimeters and $10^{-4}$ centimeters.

3. A device as defined in claim 1 wherein the thickness of the insulating layer disposed between the central and the emitter layer ranges between $10^{-7}$ centimeters and $10^{-4}$ centimeters.

4. A device as defined in claim 1 wherein the thickness of the insulating layer disposed between and central and the emitter layer ranges between $10^{-7}$ centimeters and $10^{-4}$ centimeters, and the thickness of the insulating layer between the central and the other conducting layer is approximately $10^{-3}$ centimeters.

5. A device as defined in claim 1 wherein the central conducting layer has ribs of conducting material integral therewith and spaced substantially $10^3$ electron mean free paths, the thickness of the central layer at said ribs being greater than the electron mean free paths and the thickness of said central layer between said ribs being less than the electron mean free paths.

6. An integrated barrier device for controlling electric currents comprising; three spaced layers of conductive material arranged in face-to-face relationship, one of said exterior layers being an emitter electrode, two layers of insulating material respectively interposed between and contacting the inner opposed faces of said conducting layers, the thickness of the central conductive layer being less than the electron mean free path, means for forming standing electron waves in said central conductive layer, means for applying an electrical operating potential to each of said conducting layers, and a control signal means for tuning and detuning the device to and from resonance operation.

7. A device as defined in claim 6 wherein the thickness of the inslating layer between said central and emitter layers being in the range of $10^{-7}$ to $10^{-4}$ centimeters.

8. A device as defined in claim 7 wherein the thickness of the other insulating layer is at least $10^{-4}$ centimeters.

9. A device as defined in claim 7 wherein the thickness of the other insulating layer is in the range $10^{-7}$ to $10^{-4}$ centimeters.

10. A device as defined in claim 8 wherein said last-named means includes a circuit between said emitter and third conductive layers.

11. A device as defined in claim 9 wherein said last-named means includes a circuit between said emitter and third conductive layers.

12. A device as defined in claim 6 wherein said last-named means includes a circuit between said emitter and central conductive layers.

13. An integrated barrier device for controlling electric currents comprising; an emitter layer of conductive material, a central layer of conductive material, and a third layer of conductive material, said layers being spaced apart in face-to-face relationship, two layers of insulating material respectively interposed in said spaces and contacting the inner opposed faces of the conductive layers, the thickness of the central layer being less than the electron mean free path and the thickness of the insulating layer between the third and central conductive layers being greater than the electron means free path, the potential barrier being lower than the energy of the electron, means for forming standing electron waves in said central conductive layer, means for applying an electrical operating potentional to each of said conductive layers, and control signal means for tuning and detuning the device to and from resonance operation.

14. A device as defined in claim 13 wherein said last-named means includes a circuit connecting said emitter and central conductive layers.

15. An integrated barrier device for controlling electric currents comprising: three spaced layers of conductive material arranged in face-to-face relationship, one of the exterior of said layers being an emitter electrode, two layers of insulating material respectively interposed between and contacting the inner opposed faces of said conducting layers, the thickness of the central conductive layer being equal to an integral number of electron half wave lengths whereby transmission resonance may occur, means for applying an electrical operating potential to each of said conductive layers, and means for tuning and detuning the device to resonance operation.

16. A device for controlling an electric current by modulation of a quantum mechanical potential barrier comprising: a centrally positioned and two externally positioned layers of conductive metal arranged in spaced relation, one of said external layers being an emitter electrode, two layers of insulating material arranged respectively between and contacting the inner opposed faces of the conducting layers, means for applying an electrical operating potential to each of said conducting layers, the thickness of said central conducting layer satisfying the conditions of the formula $$E_n = \frac{n^2 h^2}{8mL^2}$$

in which L is the width of the well corresponding to the central conducting layer and in which standing electron waves are formed,, E is the energy of the electron, $m$ is the electronic mass, $h$ is Planck's constant, and $n$ is an integer, and means for tuning and detuning the device to resonance operation.

References Cited in the file of this patent
UNITED STATES PATENTS
3,056,073   Mead _____ Sept. 25, 1962